United States Patent [19]

Sheldon

[11] 4,317,309

[45] Mar. 2, 1982

[54] PLANT GROWTH SUPPRESSION DEVICE

[76] Inventor: Steve S. Sheldon, 18 Steiner Blvd., Barboursville, W. Va. 25504

[21] Appl. No.: 150,902

[22] Filed: May 16, 1980

[51] Int. Cl.³ .............................................. A01G 1/08
[52] U.S. Cl. ......................................................... 47/32
[58] Field of Search ...................................... 47/32, 33

[56] References Cited

U.S. PATENT DOCUMENTS

| | | | |
|---|---|---|---|
| 3,378,949 | 4/1968 | Dorris | 47/33 |
| 3,484,989 | 12/1969 | Lazinsky | 47/33 |
| 3,619,944 | 11/1971 | Matvey | 47/33 |
| 3,803,760 | 4/1974 | Matvey | 47/33 |

Primary Examiner—Robert E. Bagwill
Attorney, Agent, or Firm—Lowe, King, Price & Becker

[57] ABSTRACT

A device for suppressing ground plant growth surrounding a monument comprises a plurality of plastic shield pieces interconnected with each other and anchored by spikes into the ground around the monument base. The lower surface of each shield piece is formed with a pair of longitudinal retaining tracks. The shield pieces are coupled together by plate members retained within the longitudinal tracks across interfaces between shield pieces. The spikes extend downwardly from the plate members to anchor into the ground. The device is usable for suppressing plant growth in any predetermined ground region.

11 Claims, 11 Drawing Figures

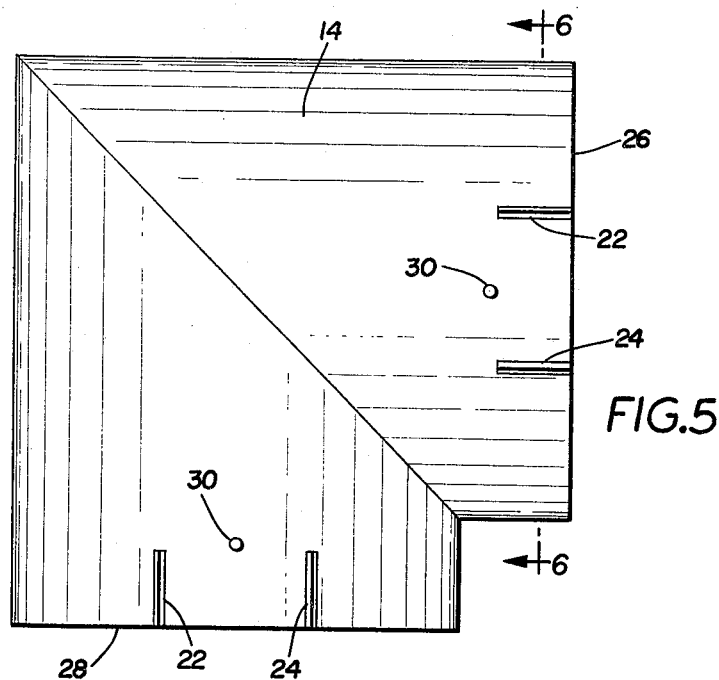
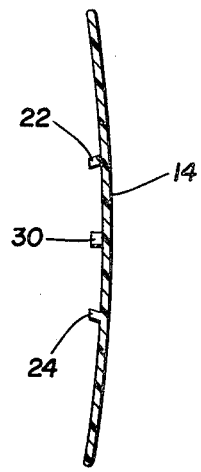
FIG.5
FIG.6
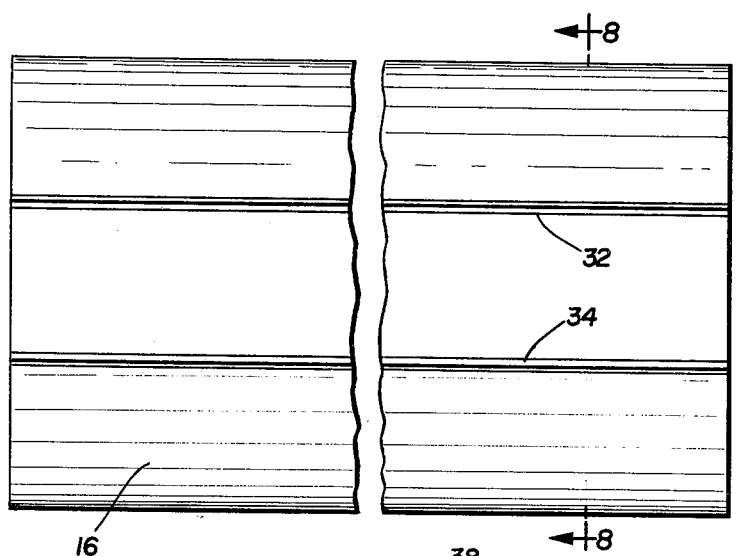
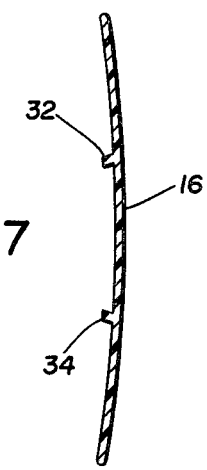
FIG.7
FIG.8
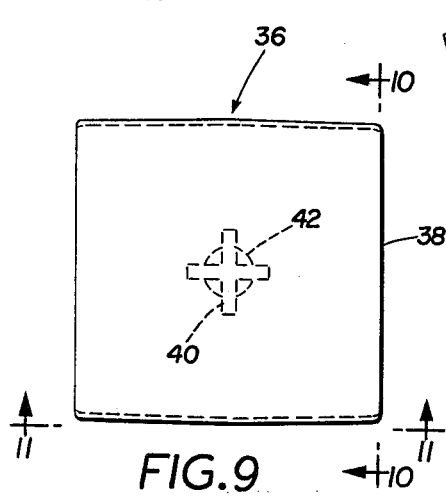
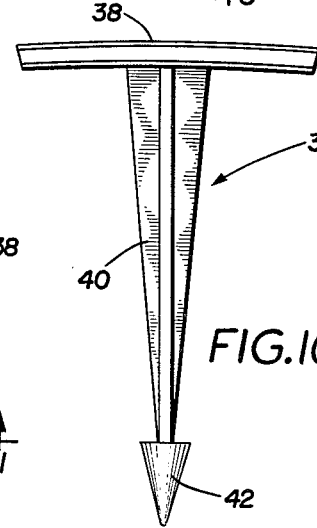
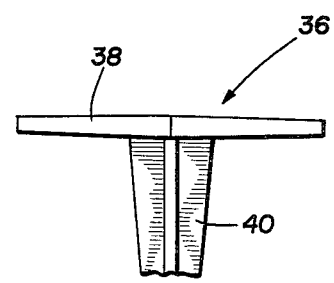
FIG.9
FIG.10
FIG.11

PLANT GROWTH SUPPRESSION DEVICE

TECHNICAL FIELD

The present invention relates generally to devices for suppressing plant growth and more particularly toward devices for suppressing plant growth around the base of a grave site monument.

BACKGROUND ART

It is often desirable to suppress plant growth in certain ground regions for ornamentation such as along the sides of a driveway or around the periphery of a house. In cemeteries, and particularly the type wherein grave site monuments are in the form of small plaques embedded in the ground, grass and weed growth around the periphery of the monuments must be periodically removed to maintain the appearance of the grave sites. Methods and devices for suppressing plant growth previously used include applying to a predetermined ground region weed killing chemicals or ornamental pebbles or other artificial ground covering. Neither approach is totally maintenance free since weed growth tends to return after a time period following chemical application and ornamental pebbles tend to become displaced. Furthermore, application of weed killing chemicals endangers neighboring plant growth. There still exists a need, particularly with respect to grave site maintenance, for a device to suppress the plant growth around the base of a monument or within other ground regions.

It is an object of the present invention, therefore, to provide a device for suppressing plant growth in a predetermined ground region without using weed killing chemicals.

Another object of the invention is to provide a device for suppressing plant growth within a predetermined ground region that is maintenance free and not apt to become inadvertently displaced from the region.

Another object is to provide a device for suppressing plant growth that is convenient to install within a ground region having an arbitrary shape and size.

DISCLOSURE OF INVENTION

A device for suppressing plant growth within a predetermined region of ground in accordance with the invention, comprises a plurality of relatively flat, opaque shield pieces formed of plastic and adapted to be interconnected into an arbitrary pattern and anchored into the ground. Plant life under the shield pieces is eliminated by deprivation of air and sunlight. The shield pieces adapted to surround the base of a grave site monument, for example, include four corner pieces interconnected by four bridging pieces. The lower surface of each piece is formed with a pair of longitudinal tracks for retaining a coupling plate. Shield pieces are interconnected by positioning the plate between the longitudinal tracks overlapping the interface between shield pieces. The coupling plates also form bases of spikes that extend downwardly into the ground for anchoring.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 5 is a bottom view of a corner piece of the device shown in FIG. 2;

FIG. 6 is a cross sectional end view of the corner piece taken along the line 6—6 in FIG. 5;

FIG. 7 is a bottom view of a bridging piece of the device shown in FIG. 2;

FIG. 8 is a cross sectional end view of the bridging piece taken along the line 8—8 in FIG. 7;

FIG. 9 is a top view of a coupling device and anchor member for interconnecting the shield pieces as shown in FIG. 2;

FIG. 10 is a side view of the coupling plate and anchor member viewed along the line 10—10 in FIG. 9; and FIG. 11 is a partial end view of the coupling plate and anchor member taken along the line 11—11 in FIG. 9.

BEST MODE FOR CARRYING OUT THE INVENTION

Figure 1:
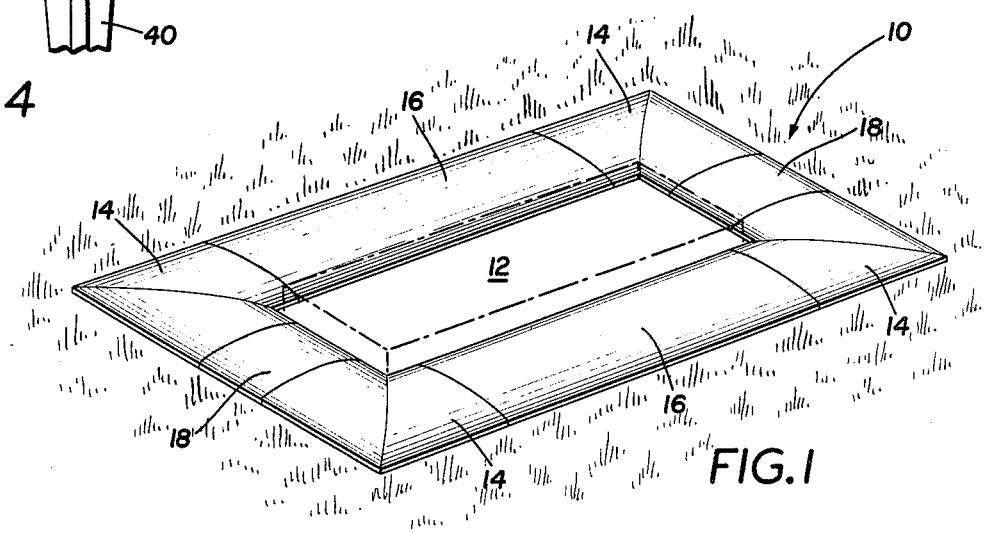
FIG. 1 is a perspective view of a plant growth suppression device, in accordance with the invention, surrounding the base of a grave site monument.

Referring to FIG. 1, a shield member 10 for suppressing plant growth in a ground region surrounding the base of a grave site monument 12, comprises a plurality of shield pieces interconnected with each other to define a frame overlying the plant growth forming a border around the monument base. The shield pieces are preferably formed of plastic and are opaque to inhibit plant growth by deprivation of air and sunlight. Although in the embodiment of FIG. 1, the shield 10 has a picture frame configuration to be positioned around the base of a monument 12, it is to be understood that a number of shield pieces of arbitrary sizes and shapes can be arranged in the manner described below to cover any predetermined ground region to form, for example, a driveway border or an ornamental border surrounding a building foundation.

Figure 2:
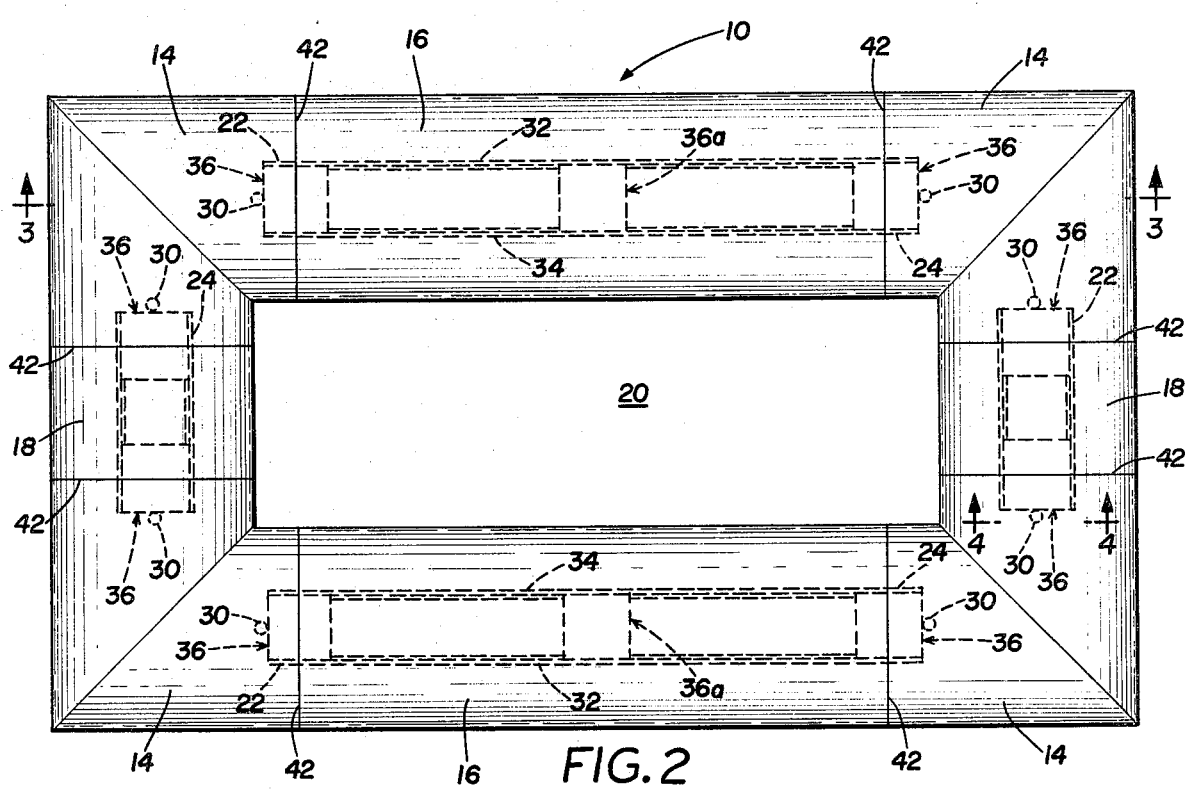
FIG. 2 is a top view of the plant growth suppression device of FIG. 1.
Figure 3:
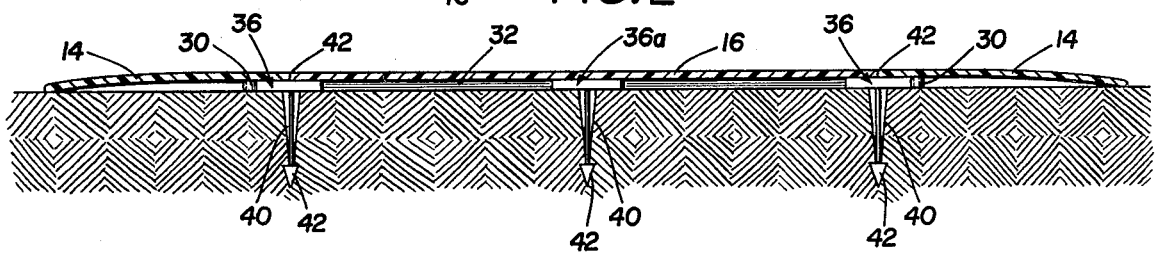
FIG. 3 is a cross sectional side view of the device taken along the line 3—3 in FIG. 2 showing the device anchored within the ground.
Figure 4:
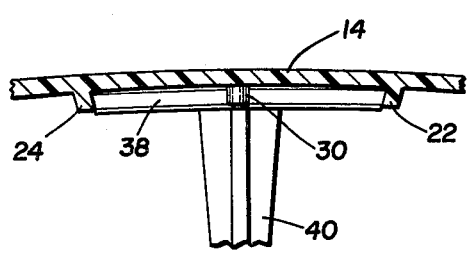
FIG. 4 is a cross sectional end view of a portion of the device taken along the line 4—4 in FIG. 1 showing a coupling plate located between a pair of longitudinal retaining tracks.

Referring to FIGS. 2 and 3, the shield 10 is formed of four identical corner pieces 14 interconnected by bridge pieces 16 and 18. The bridge pieces 16 have equal lengths forming the upper and lower horizontal sides of the shield whereas the lengths of pieces 18 forming the two vertical sides of the shield are equal to each other and less than the lengths of pieces 16. The assembly of shield pieces 14, 16 and 18 define a central opening 20 having a configuration corresponding to that of the monument 12. Other sizes and shapes of shield 10 can be provided using bridging pieces 16 and 18 of respectively different lengths.

The corner pieces 14 and bridge pieces 16, 18 have identical mating cross sections as shown in FIGS. 6 and 8 so that the shield when assembled is formed with a continuous exposed surface as shown in FIGS. 1-3. The shield pieces 14, 16 and 18 are substantially planar in configuration with all edges bowed slightly downwardly as shown in FIGS. 1 and 3 to contact the ground. The downward bow of the shield pieces 14, 16 and 18 improves the aesthetic appearance of the shield 10 as well as helps protect the edges from damage by lawn maintenance equipment.

Referring to FIGS. 5 and 6, the lower surface of each of the corner pieces 14 is formed with a pair of slightly inwardly directed longitudinal tracks 22 and 24 extending from mating ends 26 and 28 for a portion of each leg of the corner piece. Centrally located between each pair of tracks 22 and 24 is a projecting stop member 30 having a function to be described below.

Similarly, referring to FIGS. 7 and 8, each of the bridge members 16, 18 has a lower surface formed with longitudinal tracks 32 and 34 extending along the entire length of the bridge member. The tracks 32 and 34 are angled slightly inwardly as shown in FIG. 8 at angles and positions corresponding to those of tracks 22 and 24 in FIG. 6.

Referring to FIGS. 9-11, a combination coupling plate and anchor member identified generally by the numeral 36 comprises a coupling plate 38 having a width corresponding to the distance between tracks 22 and 24 in corner pieces 14 and tracks 32 and 34 in corner pieces 16 and having a slightly bowed upper surface configuration corresponding to the lower surface configurations of the pieces 14 and 16. Extending downwardly from coupling plate 38 is an anchor spike 40 having a conical end portion 42. The spike 40 is preferably formed of a cross piece as shown in FIG. 9 for rigidity and minimum resistance to ground insertion. Once inserted into the ground, the conical end piece 42 tends to retain the spike 40 for anchoring.

The shield 10 is assembled by positioning a number of members 36 within the tracks 22 and 24 of corner pieces 14 and within tracks 32 and 34 of bridge pieces 16, 18, as shown in FIG. 2, with a coupling plate 38 positioned at each interface 42 between adjacent pieces. Additional coupling plates 38, such as plates 38a, may be located along the lengths of bridge pieces 16 for additional anchoring as shown in FIG. 2. The coupling plates 36 are free to slide longitudinally between tracks 22, 24 and 32, 34 to be positioned arbitrarily, but one plate 36 is oriented at each of the interfaces 42 by the stop members 30 (see FIGS. 5 and 6) as shown in FIG. 2.

As shown in FIG. 3, the assembled shield 10 is anchored to the ground around the monument 12 by the spikes 40 extending downwardly from coupling plates 36 and 36a. The slightly bowed configuration of the corner pieces 14 and bridge pieces 16 with down turned edges help provide runoff of rain water as well as protect the edges from damage by lawn maintenance equipment as mentioned above and from interference with walkers.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, it is to be understood that the shield 10 can be formed in configurations other than the frame-like structure shown in FIG. 2 and shield pieces other than the right angle corner pieces 14 and square or rectangular bridge pieces 16, 18 of the preferred embodiment can be provided to accommodate any size and shape of ground to be covered. It is also to be appreciated that in the configuration of FIG. 2, only two different configurations of shield pieces must be stocked, viz, the right angled corner pieces 14 and bridge pieces 16, 18. The bridge pieces 16, 18 may be stocked in four foot lengths, for example, that are cut to size defining the sides of the monument 12 with which the shield is used.

I claim:

1. An apparatus for suppressing plant growth within a predetermined ground region surrounding a monument or the like, comprising:
   (a) a shield member having a plurality of shield pieces covering the predetermined ground region, thereby eliminating undergrowth through deprivation of air and sunlight; and
   (b) means for coupling together said shield pieces, said coupling means including longitudinal track means projecting downwardly from a lower surface of each shield piece, said coupling means further including a coupling plate capable of sliding retention within said track means, the entire coupling plate being substantially flat to enable said coupling plate to securely interfit with said track means and lower surfaces of adjacent shield pieces for coupling together said shield pieces when said coupling plate is positioned across an interface between adjacent pieces.

2. An apparatus according to claim 1, further comprising means for anchoring said shield member in the ground.

3. An apparatus according to claim 2, wherein said anchoring means includes a spike member projecting downwardly from said coupling plate.

4. An apparatus according to claim 3, wherein said shield pieces include a plurality of identical corner pieces and a plurality of identical bridge pieces.

5. An apparatus according to claim 4, wherein said track means extends longitudinally along the lower surfaces of said shield pieces from an end thereof a distance less than the length of each of said shield pieces.

6. An apparatus according to claim 5, wherein said longitudinal track means includes a pair of substantially straight track members formed inwardly spaced from side edges of each shield piece, said track members defining a track width that is substantially less than the width of said shield pieces.

7. An apparatus according to claim 6, wherein said track members are inwardly inclined, said coupling plates having side edges oppositely inclined to the inclination of said track members for complimentary, interfitting engagement therewith.

8. An apparatus according to claim 6 or 7, wherein said corner pieces include stop members for positioning said coupling plates at said interfaces.

9. An apparatus according to claim 3, wherein said spike members are formed as cross pieces for maximum rigidity and minimum resistance to ground insertion, wherein a free end of said spike members is conically shaped to retain the spike in the ground after insertion.

10. An apparatus according to claim 1, wherein each of said shield members is bowed slightly downwardly at opposite edges thereof.

11. An apparatus for suppressing plant growth within a predetermined ground region surrounding a monument or the like, comprising
   (a) a shield member having a plurality of corner and bridge shaped shield pieces covering the predetermined ground region, thereby eliminating undergrowth through deprivation of air and sunlight; and
   (b) means for coupling together said shield pieces, said coupling means including longitudinal track means projecting downwardly from a lower surface of each shield piece, said coupling means further including a coupling plate capable of sliding retention within said track means, and stop members formed in the lower surface of the corner pieces within the guide path formed by said track means, said stop members positioning said coupling plates across an interface formed between pairs of adjacent corner and bridge pieces to prevent disengagement therewith.

* * * * *